(12) United States Patent
Okano et al.

(10) Patent No.: US 8,254,790 B2
(45) Date of Patent: Aug. 28, 2012

(54) COMMUNICATIONS SYSTEM AND COMMUNICATIONS LIGHTING APPARATUS

(75) Inventors: Nobukata Okano, Kanagawa (JP);
Yoshiaki Watanabe, Kanagawa (JP);
Jugo Mitomo, Kanagawa (JP);
Tomomori Hino, Kanagawa (JP);
Hironobu Narui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/067,608

(22) Filed: Jun. 14, 2011

(65) Prior Publication Data

US 2011/0249975 A1    Oct. 13, 2011

Related U.S. Application Data

(63) Continuation of application No. 10/809,432, filed on Mar. 26, 2004, now abandoned.

(30) Foreign Application Priority Data

Apr. 7, 2003    (JP) ................................. 2003-103425

(51) Int. Cl.
*H04B 10/10*    (2006.01)
(52) U.S. Cl. ........................................ 398/172
(58) Field of Classification Search .................... 398/172
See application file for complete search history.

(56) References Cited

U.S. PATENT DOCUMENTS

| | | | |
|---|---|---|---|
| 5,218,466 A | 6/1993 | Brooks | |
| 5,424,859 A * | 6/1995 | Uehara et al. | ................. 398/127 |
| 5,606,419 A | 2/1997 | Foosnaes et al. | |
| 5,675,427 A | 10/1997 | Miller | |
| 5,838,116 A | 11/1998 | Katyl et al. | |
| 6,198,230 B1 | 3/2001 | Leeb et al. | |
| 6,292,744 B1 | 9/2001 | Want et al. | |
| 6,522,437 B2 | 2/2003 | Presley et al. | |
| 6,548,967 B1 * | 4/2003 | Dowling et al. | ............... 315/318 |
| 6,868,236 B2 | 3/2005 | Wiltsey et al. | |
| 7,099,589 B1 | 8/2006 | Hiramatsu | |
| 2003/0043972 A1 | 3/2003 | Burnham et al. | |

FOREIGN PATENT DOCUMENTS

| | | |
|---|---|---|
| JP | 64-053640 | 3/1989 |
| JP | 2668793 | 7/1997 |
| JP | 11-259491 | 9/1999 |

(Continued)

OTHER PUBLICATIONS

EPO Search Report mailed Nov. 28, 2005.

(Continued)

*Primary Examiner* — Leslie Pascal
(74) *Attorney, Agent, or Firm* — Rader Fishman & Grauer, PLLC

(57) ABSTRACT

An optical-information transmitting, lighting apparatus 2 is installed in a place where a lighting apparatus of the existing type for applying light generally used is provided. The lighting apparatus 2 comprises an illumination light source 4 for applying light and an information-transmitting unit 5 for transmitting optical information. A person who may receive information from the lighting apparatus 2 has a mobile terminal 3, which receives the optical information transmitted from the information-transmitting unit 5. Since the lighting apparatus of the existing type is widely used in our living space. Hence, the optical-information transmitting, lighting apparatus 2 can convert every place where an existing type lighting apparatus is used, into an optical communications space.

20 Claims, 5 Drawing Sheets

FOREIGN PATENT DOCUMENTS

| | | |
|---|---|---|
| JP | 2004-265774 A | 9/2004 |
| WO | WO-01/33747 | 5/2001 |
| WO | WO-02/25842 A2 | 3/2002 |

OTHER PUBLICATIONS

Japanese Office Action issued on Jul. 22, 2008 for corresponding Japanese Application No. 2003-103425.

Japanese Office Action issued Mar. 10, 2009 for corresponding Japanese Application No. 2003-103425.

EPO Search Report dated Jul. 23, 2004.

EPO Search Report Jul. 14, 2004.

Ramaswami, R. and K.N. Sivarajan, Optical Networks: A Practical Perspective. 2nd ed. Academic Press: San Diego, CA, 2002.

Service, Robert F. "Laser Technology: Hot New Beam May Zap Bandwidth Bottleneck." Science Dec. 21, 2001. Viewed on May 28, 2007 <http://www.sciencemag.org/cgi/content/full/294/5551/2454>.

Newton, H. "Floppy disk," "Floppy mini," "Removable cartridge system," "Removable media." Newton's Telecom Dictionary. 8th ed. 1994.

Kahn, J.M. and J.R. Barry. "Wireless infrared communications." Proceedings of the IEEE. vol. 85, No. 2, Feb. 1997: 265-298.

* cited by examiner

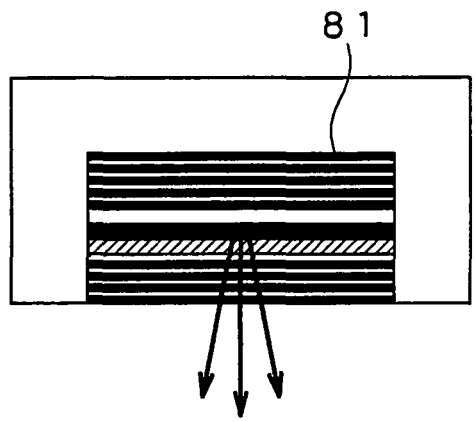 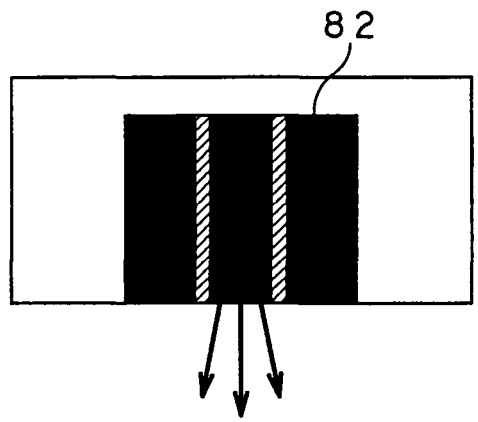
FIG.6A    FIG.6B
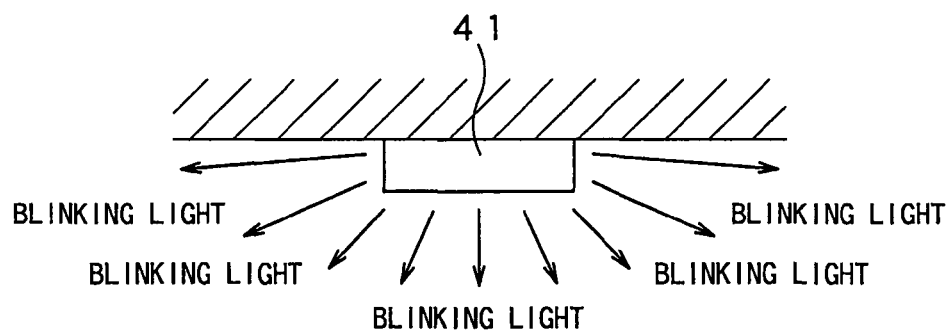
FIG.7A
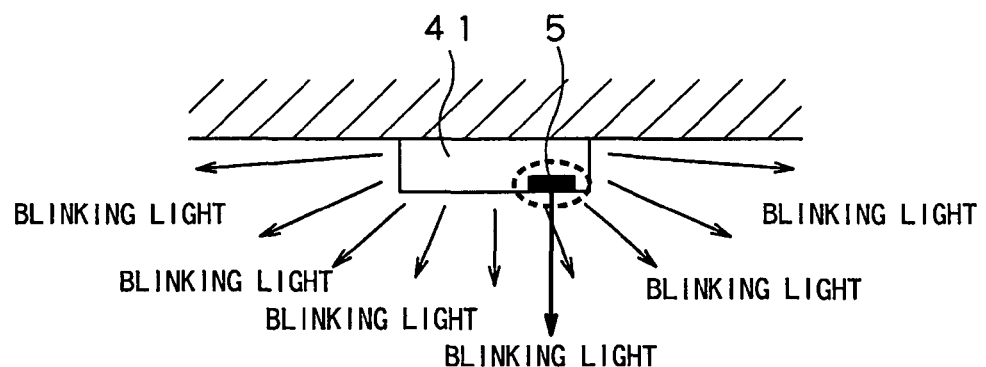
FIG.7B

COMMUNICATIONS SYSTEM AND COMMUNICATIONS LIGHTING APPARATUS

CROSS REFERENCES TO RELATED APPLICATIONS

The present invention is a Continuation of application Ser. No. 10/809,432, filed Mar. 26, 2004, which contains subject matter related to Japanese Patent Application JP 2003-103425 filed in the Japanese Patent Office on Apr. 7, 2003, the entire contents of which being incorporated herein by references.

BACKGROUND OF THE INVENTION

1. Field of the Invention

The present invention relates to a communications system and a communications lighting apparatus, each using illumination light to accomplish optical communication.

2. Description of the Related Art

Recent years have seen a fast progress in broadband, wired or wireless communications technology as the increase in amount of personal use information. To be more specific, communication service using existing telephone lines, such as ADSL (Asymmetric Digital Subscriber Line), has come into use. Communication can therefore be achieved at high speed and low cost. The next-generation, high-speed communication means is optical communication. Light sources, communications modules, communications apparatuses and communications systems, all required in optical the home network or FTTH (Fiber-To-The-Home) network, either utilizing light, are now being developed.

The light-emitting means most widely used in our daily life is lighting apparatuses. The lighting apparatuses are indispensable to our life. They are installed everywhere and are used day and night. Lighting apparatuses generally used are fluorescent lamps and incandescent bulbs. They find their use in houses, working places, public institutions, and the like. To save energy, lighting apparatuses having light-emitting diodes (LEDs) or employing organic EL (Electric Luminescence) have been recently developed.

There are various systems in which light is used for communication. Among these systems is one used to control a robot. In this system, a light-emitting/receiving device is provided on the ceiling or wall of the room in which the robot works. Optical communication is performed between the robot and the light-emitting/receiving device. A system of this type is disclosed in, for example, Japanese Patent No. 2668793.

The system disclosed in Japanese Patent No. 2668793, however, is designed for limited use only, for example in plants. The information transmitted and received is limited to the data for controlling a robot. This system does not fully utilize lighting apparatuses that are light-emitting means widely and commonly used.

As pointed out above, lighting apparatuses are broadly used in our living space to apply light. The light they emit is not utilized in optical communication, however. This means that the existing lighting infrastructure is not fully used in our daily life.

SUMMARY OF THE INVENTION

The present invention has been made in view of the foregoing. An object of this invention is to provide a communications system and a communications lighting apparatus, each using illumination light to accomplish optical communication.

To achieve the object specified above, a communications system according to this invention comprises a communications lighting apparatus having a first light source unit which emits illumination light and a second light source unit which transmits information in the form of an optical signal and a mobile terminal device which receives the optical signal emitted by the second light source unit.

A communications lighting apparatus according to the present invention comprises a first light source unit, which emits illumination light, and a second light source unit, which transmits information in the form of an optical signal.

As described above, the present invention utilizes lighting apparatuses of the existing type to transmit optical information. Since the lighting apparatuses are widely used in our living space, the invention can accomplish optical communication in various places.

The communications lighting apparatus of this invention can be used in place of a conventional lighting apparatus. Thus, it can be installed at low cost by using the existing lighting infrastructure.

Moreover, the communications lighting apparatus of the invention can transmit information at high speed and high precision. This is because the second light source unit comprises light sources that emit light beams of different wavelengths or a combination of an end-plane emission semiconductor laser, a vertical-plane emission semiconductor laser, and a quantum-cascade semiconductor layer. The communications lighting apparatus can therefore transmit information at high speed and high precision. In addition, the second light source unit can be small.

BRIEF DESCRIPTION OF THE SEVERAL VIEWS OF THE DRAWING

FIG. 6A is a sectional view of a light-emitting element that may be used in this invention;

FIG. 6B is a sectional view another type of a light-emitting element that may be used in this invention;

FIG. 7A is a schematic diagram that explains how an illumination light source transmits an optical signal;

FIG. 7B is a schematic diagram that explains how an illumination light source of another type transmits an optical signal.

DETAILED DESCRIPTION OF THE INVENTION

A lighting communications system 1 according to the present invention will be described. The lighting communications system 1 utilizes a lighting apparatus, which is an element of the lighting infrastructure, to accomplish optical communication. In system 1, the lighting apparatus performs not only its essential function of providing people with a "view field," but also an additional function of achieving optical communication.

Figure 1:
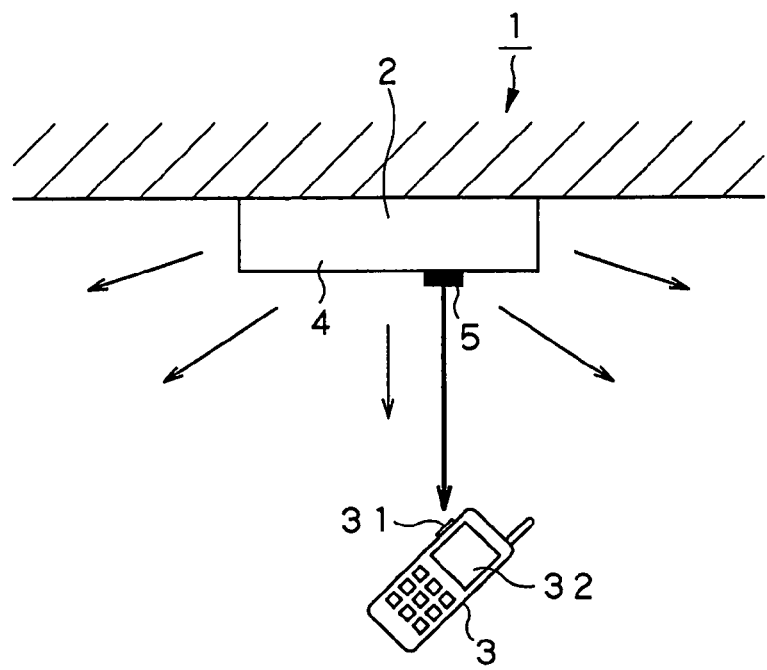
FIG. 1 is a schematic diagram that illustrates a lighting communications system according to the present invention.

FIG. 1 shows a lighting communications system 1 according to this invention. The lighting communications system 1 comprises an optical-information transmitting, lighting apparatus 2 and a mobile terminal 3. The lighting apparatus 2 can transmit optical information in the form of an optical signal. The mobile terminal 3 can receive the optical signal that the lighting apparatus 2 has emitted.

The mobile terminal 3 has a light-receiving unit 31 and a display unit 32. The light-receiving unit 31 can receive the optical signal transmitted from the optical-information transmitting, lighting apparatus 2. The display unit 32 can display to a user the information represented by the optical signal. The mobile terminal 3 is, for example, a mobile telephone, a PDA (Personal Digital Assistants) or a laptop computer. The mobile terminal 3 may have a buzzer or LED in addition to the display unit 32. In this case, the buzzer or LED can inform the user that the terminal 3 is receiving an optical signal from the optical-information transmitting, lighting apparatus 2.

Figure 2A:
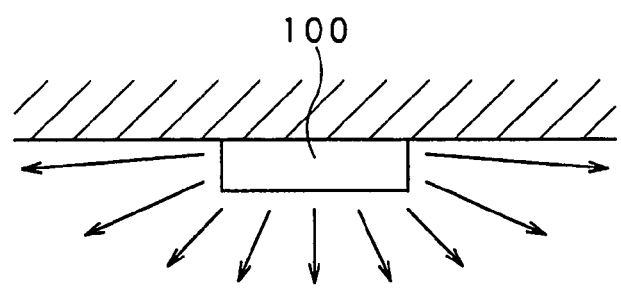
FIG. 2A is a diagram illustrating how a conventional lighting apparatus emits light.
Figure 2B:
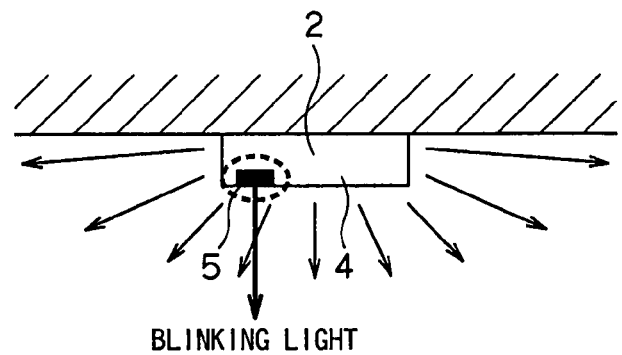
FIG. 2B is a diagram showing how an optical-information transmitting, lighting apparatus according to the invention emits light, or how it transmits optical information.

The configuration of the optical-information transmitting, lighting apparatus 2 will be described in detail. FIG. 2A illustrates how a conventional lighting apparatus 100 emits light. FIG. 2B shows how the optical-information transmitting, lighting apparatus 2 according to this invention emits light. As seen from FIG. 2B, the conventional lighting apparatus 100 is a light source that is designed to provide light (view field) only. In contrast, the optical-information transmitting, lighting apparatus 2 has not only an illumination light source 4 but also an information-transmitting unit 5. The information-transmitting unit 5 emits light intermittently. Note that the illumination light source 4 is, for example, a fluorescent lamp, an incandescent lamp, a LED or an organic EL device.

The optical-information transmitting, lighting apparatus 2 can be installed and replaced in the same way as any lighting apparatus generally and commonly used. It may be used in place of the conventional lighting apparatus 100 to provide a region in which optical communication can be carried out. Like the conventional lighting apparatus 100, the lighting apparatus 2 can be installed in various regions in our living space. Thus, the lighting apparatus 2 can turn these regions into optical communications regions. It should be noted that the illumination light source 4 is not limited to a fluorescent lamp or an incandescent lamp, which is used to provide light (view field). Rather, the illumination light source 4 may be an electric bulletin board or light-emitting markers.

The information-transmitting unit 5 is a device mounted on the illumination light source 4 to implement the spatial transmission of optical information (i.e., optical data communication). Unit 5 is a combination of, for example, a semiconductor laser and some components. It is a multi-beam device that emits many beams of different wavelengths, thus achieving planar light-emission. Moreover, the information-transmitting unit 5 incorporates an integrated circuit (IC) that drives the laser (i.e., light source) intermittently.

Figure 3:
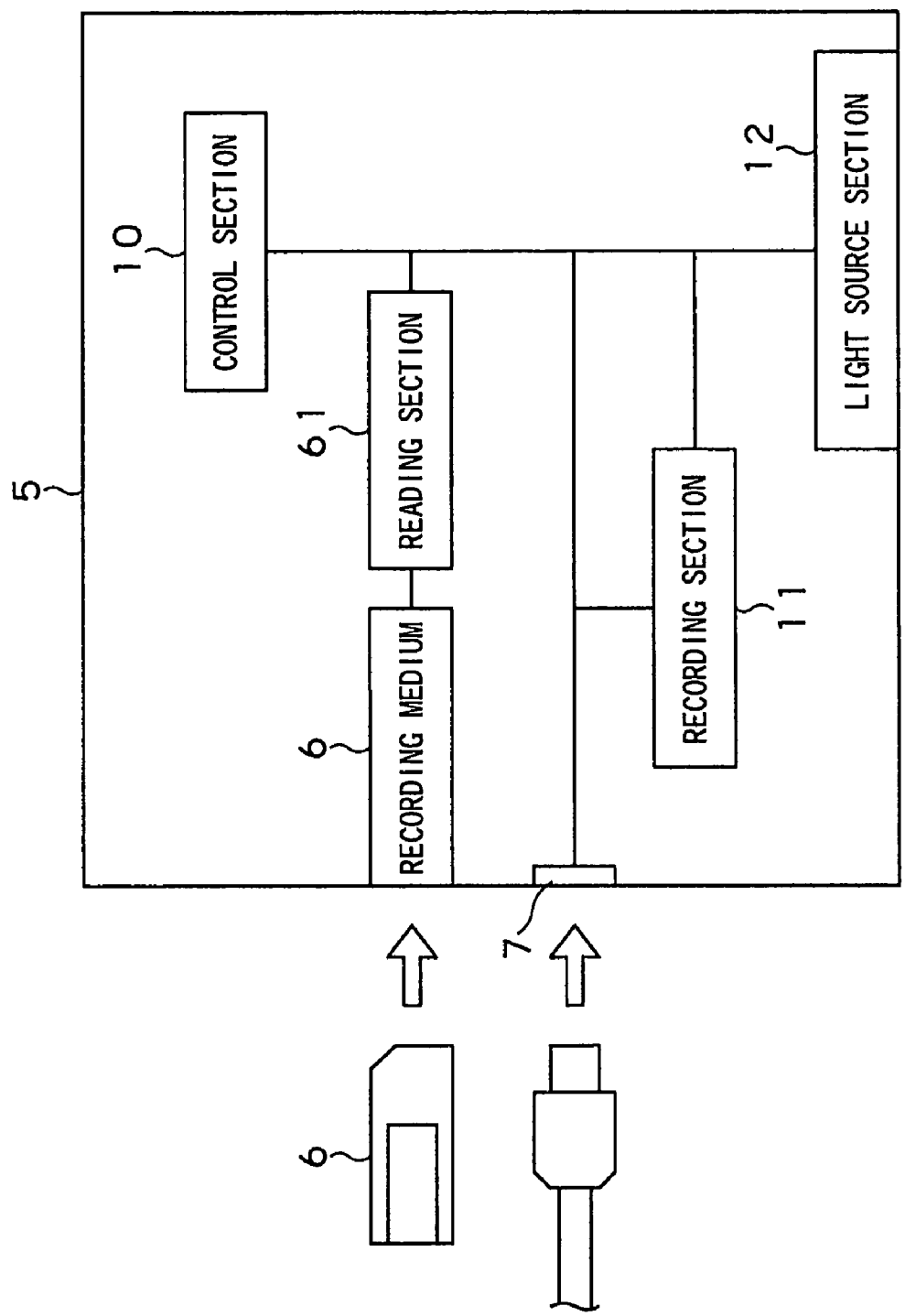
FIG. 3 is a block diagram representing the internal structure of the information-transmitting unit incorporated in the lighting apparatus shown in FIG. 2B.

FIG. 3 is a block diagram representing the internal structure of the information-transmitting unit 5. The information-transmitting unit 5 comprises a light source section 12, a recording section 11, a recording medium 6, and a control section 10. The light source section 12 supplies optical signals. The recording section 11 records optical signals representing information. The recording medium 6 stores information from which optical signals may be generated. The control section 10 controls the light source section 12. Section 10 reads information from the recording section 11 or the recording medium 6, generates optical signals corresponding to the information and makes the light source section 12 supply the optical signals.

The information-transmitting unit 5 further comprises a reading section 61 for reading information from the recording medium 6 to change the information represented by optical signals. The recording medium 6 is, for example, a semiconductor memory such as a memory stick. The information-transmitting unit 5 has an interface 7 for receiving the information represented by optical signals supplied from external devices. The interface 7 is, for example, a Universal Serial Bus (USB) or a fiber connector. In the information-transmitting unit 5, the recording section 11 provided in the above-mentioned IC records the optical signals supplied from the external devices (e.g., information terminals and servers) through the interface 7. Therefore, the user of the information-transmitting unit 5 can change the information represented by optical signals, in the same way as with a personal computer. Note that the recording medium 6 and the reading section 61 constitute an information-changing means and the interface 7 and the recording section 11 constitute another information-changing means. It suffices for the information-transmitting unit 5 to have at least one of these information-changing means.

The light source section 12 has a semiconductor laser or a quantum cascade laser, whose oscillation band ranges from the near-infrared band (780-nm) to the intermediate far-infrared band (1.5-μm or more). A quantum cascade laser may be used, because it emits a very coherent beam that propagates straight. Having either a semiconductor laser or a quantum cascade laser, the section 12 can emit optical signals that are more intensive and, hence, can be received more readily than beams emitted from a scattered light source. The quantum cascade laser can emit a beam having a wavelength falling within the intermediate far-infrared band (particularly, a region of 3 to 4 μm or a region of 8 to 13 μm). The intermediate far-infrared band is known as a "window in the atmosphere." Light having a wavelength within this band is scarcely absorbed by water vapor in the atmosphere. Thus, the use of this band makes it possible to suppress the degradation of the optical signal. This ultimately accomplishes a long-distance, spatial transmission of optical signals.

The energy E of the light used in the spatial transmission is given:

$$E = hc/\lambda$$

where h is Planck's constant, c is the velocity of light, and λ, is the wavelength of light used.

Since the light source section 12 has a laser that emits a beam having a long wavelength falling within the range specified above, the information-transmitting unit 5 is a device that is very safe to the human eye.

The information-transmitting unit 5 may have a multi-beam laser device that comprises a plurality of lasers and emits a plurality of laser beams. The multi-beam laser device may be a multi-beam laser designed for use in high-speed laser-beam printers or a two-wavelength laser designed to reproduce data from CDs or DVDs. Among the multi-beam laser devices available are one type that can emit a plurality of laser beams independently and another type that can emit laser beams of different wavelengths independently.

Figure 4A:
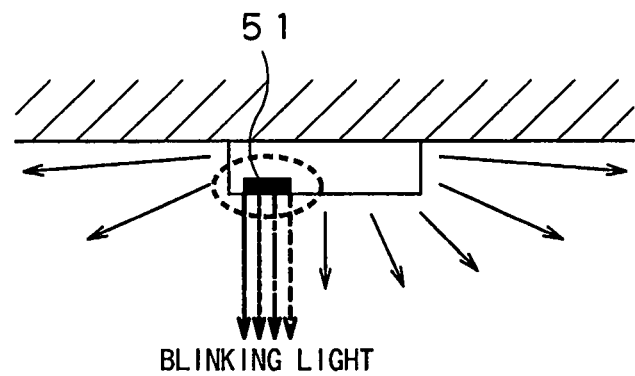
FIG. 4A is a schematic diagram explaining how one information-transmitting unit emits laser beams of the same wavelength to achieve optical communication.

FIG. 4A is a schematic diagram that explains how one information-transmitting unit 51 provided in the optical-information transmitting, lighting apparatus 2 emits a plurality of laser beams. In this unit 51, the lasers are independently driven, emitting parallel laser beams of the same wavelength. The more beams are emitted, the greater the amount of information that will be transmitted. Thus, the information-transmitting unit 51 can help to achieve high-speed optical communication involving a large amount of information, such as moving-picture data, as will be increasingly desired in the near future.

Figure 4B:
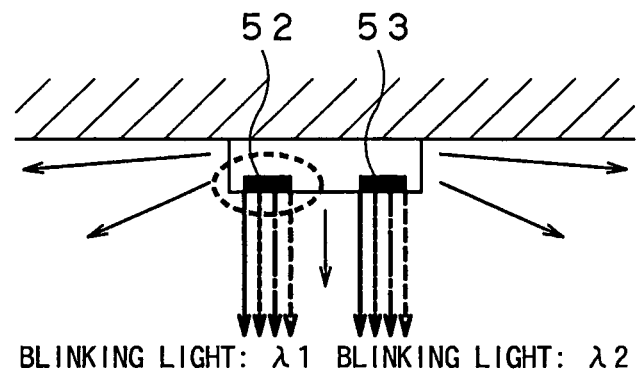
FIG. 4B is a schematic diagram explaining how one information-transmitting unit emits laser beams of one wavelength and another information-transmitting unit emits laser beams of another wavelength, in order to accomplish optical communication.

FIG. 4B is a schematic diagram showing how two information-transmitting units 52 and 53, both provided in the optical-information transmitting, lighting apparatus 2, emit laser beams. As shown in FIG. 4B, the information-transmitting unit 52 has lasers that emit beams having wavelength λ1, whereas the information-transmitting unit 53 has lasers that emit beams having wavelength λ2. Hence, laser beams of one wavelength can convey information that cannot be conveyed by laser beams of another wavelength. Thus, the units 52 and 53 cooperate to accomplish high-speed optical communication involving a large amount of information.

Figure 5:
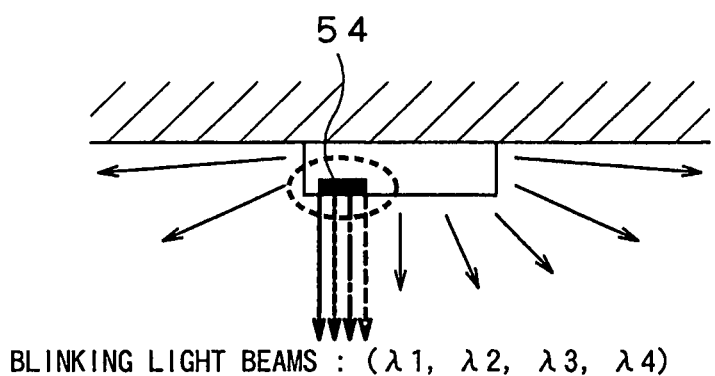
FIG. 5 is a schematic diagram explaining how one information-transmitting unit, which is a multi-beam laser or a multi-wavelength laser, emits laser beams to achieve optical communication.

FIG. 5 is a schematic diagram explaining how one information-transmitting unit 54 provided in the optical-information transmitting, lighting apparatus 2 emits a plurality of laser beams. In this unit 54, the lasers are independently driven, emitting parallel laser beams of different wavelengths. Thus, a single information-transmitting unit, namely, the unit 54, works in the same way as the two units 52 and 53 shown in FIG. 4B. Unit 54 can alone accomplish high-speed optical communication involving a large amount of information.

The lasers used in the information-transmitting unit 5 may be an IC element 81 shown in FIG. 6A or an IC element 82 shown in FIG. 6B. FIG. 6A is a sectional view of the IC element 81 of the vertical cavity surface emission (VCSEL) type. The IC element 81 emits a laser beam in the direction of the arrows. The IC element 81 is a laser comprising a semiconductor wafer, a light-emitting layer and reflection layers. The light-emitting layer and the reflection layers are provided on the semiconductor wafer, one laid upon another in a direction perpendicular to the surface of the wafer. The IC element 81 emits light in this direction. It can emit light at a smaller power than the IC element 82 illustrated in FIG. 6B.

FIG. 6B is a sectional view of the IC element 82 of the Fabry-Perot edge emitting (FP) type. The IC element 82 emits laser beams in the directions of the arrows. The IC element 82 is a laser comprising a semiconductor wafer and stripe-shaped light-emitting layers. The light-emitting layers are arranged in a direction parallel to the surface of the semiconductor wafer, and each have reflecting surfaces. Each light-emitting layer emits light from one end exposed at one surface of the wafer, in a direction parallel to the surface of the wafer. The IC element 82 has small light-emitting regions. Its light-emitting points can therefore be easily limited. Since the IC element 82 emits a plurality of laser beams, each independent of any other. Therefore, a plurality of light sources need not be used in the information-transmitting unit 5. This helps to make the unit 5 small and reduce the number of components thereof The optical-information transmitting, lighting apparatus 2 may have a laser or lasers of various types, including the two above-mentioned types. To select one type for use in the optical-information transmitting, lighting apparatus 2, the operating characteristics of the various types available should be considered to determine which type serves to manufacture the lighting apparatus 2 easily. Further, a method of extracting light from the laser or lasers should be devised in view of the structure and internal configuration of the optical-information transmitting, lighting apparatus 2. Thus, the lighting apparatus 2 can be a small, high-performance apparatus.

Another type of the optical-information transmitting, lighting apparatus 2 will be described. As FIG. 7A shows, this lighting apparatus 2 has an illumination light source 41 that is designed to apply "light." The illumination light source 41 intermittently emits light, thus transmitting an optical signal. The light beam the illumination light source 41 emits is incoherent. The amount of information that the illumination light source 41 can transmit is limited. Nonetheless, the light it emits propagates by radiation, which is a characterizing feature of scattered light. An incoherent light beam can convey optical signals in a broad region.

FIG. 7B shows still another type of the optical-information transmitting, lighting apparatus 2. This lighting apparatus 2 has an illumination light source 41 and an information-transmitting unit 5. The light source 41 emits a coherent light beam. The information-transmitting unit 5 emits a coherent light beam too. Namely, both the light source 41 and the unit 5 emit an optical signal. A coherent light beam can be detected, but in a limited region. Nevertheless, it can be detected in a broader region if it is combined with another coherent light beam. Incoherent light beams have low intensity and can hardly be detected. Nonetheless, it can be detected if it is combined with a coherent light beam, thereby suppressing a transmission error or noise of the optical signal it conveys.

Figure 8:
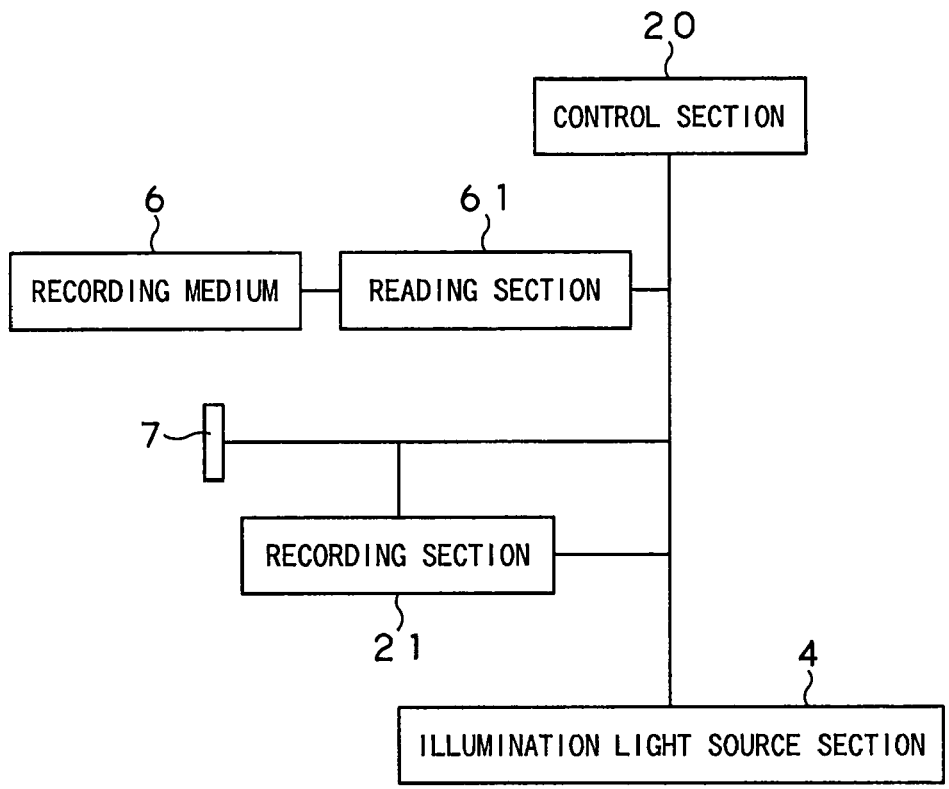
FIG. 8 is a block diagram showing a control unit for controlling an illumination light source and an information-transmitting unit.

Each of the illumination light sources 41 shown in FIGS. 7A and 7B must be used in combination with a control unit that drives the light source 41 intermittently. Such a control unit 20 is depicted in FIG. 8. The information to be conveyed by an optical signal that the light source 41 should emit is recorded in a recording unit 21 or a recording medium 6. In accordance with this information, the control unit 20 intermittently drives the illumination light source 41. Thus driven, the light source 41 intermittently emits light. The control unit 20 may control not only the illumination light source 41 but also the information-transmitting unit 5. The other components shown in FIG. 8, which are identical to those illustrated in FIG. 2, are designated by the same reference numerals and will not be described.

Figure 9:
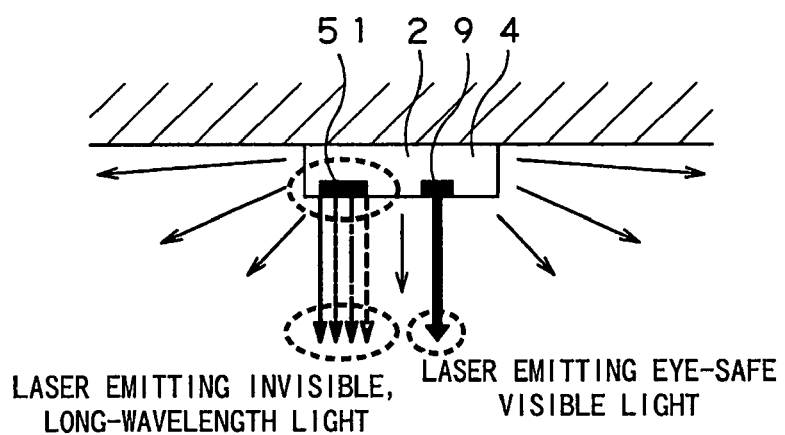
FIG. 9 shows a lighting apparatus having a laser for emitting visible laser beams and illustrates a region in which optical information can be received.

FIG. 9 depicts an optical-information transmitting, lighting apparatus 2 that has a visible-light laser 9 for emitting visible laser beams. FIG. 9 also illustrates a region in which optical information can be received. Most light sources employed in optical communication emit light having a wavelength in the near-infrared band (780-nm) or a longer wavelength. The light they emit is therefore invisible to the human eye. Although the light any visible-light laser emits has a great energy, light invisible to the human eye is used in the present embodiment. Thus, the optical-information transmitting, lighting apparatus 2 of FIG. 9 is of so-called "eye-safe design," not emitting light beams that are harmful to the human eye.

The use of lighting communications system 1 will be explained. The optical-information transmitting, lighting apparatus 2 can provide information in the form of advertisements, bulletins, memoranda, guidance and the like. Profit organizations, such as companies, may use the optical-information transmitting, lighting apparatus 2 to give advertisements, merchandizing-guidance, service information and the like. Public institutions may utilize the lighting apparatus 2 to provide bulletins, guidance and information. People may use the apparatus 2 to give advertisements, set up bulletins and disclose information such as personal memos.

The optical-information transmitting, lighting apparatus 2 that achieves optical communication may be installed in convenience stores, on the platforms and wickets of railway stations, in train cars, at the gates to buildings, in parking lots, on car headlights, on electric bulletin boards, and the like.

Any lighting apparatuses applies light, providing "information from a view field." From the "information in a view field," we can visually recognize the space where a person is and any object that exists in the space. The optical-information transmitting, lighting apparatus 2 gives a person the information about the place where he or she is and any object that is arranged in the place.

If installed, for example, in a train car, on a platform of a station or at an wicket thereof, the optical-information transmitting, lighting apparatus 2 can give to people information about the trains in service and information suggesting how they may spend time efficiently in the trains. The information about the trains may include data about the station, station yard guides, sightseeing guides, the time table, delayed departures and arrivals, line-transfer guides, the time required to reach a specific destination, and the like. The information suggesting an efficient use of time in the trains may be a list of books people may read in the trains and a list of games they may enjoy in the trains. Trains are a means of transportation that are used by a great number of people of various ages. In view of this, the lighting apparatus 2 may provide an advertisement at the request of enterprises and local governments.

If the lighting apparatus 2 is installed outdoors, for example, on the street at the gate to a building or a parking lot, it can give information about the place where it is installed. The information may be the address of the place, the regulations valid in the place, the security condition of the place, the details of the real estate available in the place, the rooms for rent, the guide to the parking lot, the guide to the nearest station, or an advertisement.

The optical-information transmitting, lighting apparatus 2 may be installed in a convenience store. In this case, the lighting apparatus 2 can provide information about the store and the goods sold in the store, data on other stores, brand-new goods, and the prices of the goods and the calories of foods. Further, the lighting apparatus 2 may display an advertisement. If the lighting apparatus 2 is installed on car headlights, it may display the registered car number, the car-inspection record and the personal advertisement of the car owner. Suppose the lighting apparatus 2 is installed on an electric bulletin board. Then, it may display an advertisement, a guide to various schools, or the like.

If the optical-information transmitting, lighting apparatus 2 is installed outdoors, the optical information it can provide will not be limited to advertisement. Rather, the lighting apparatus 2 can give information useful to the public, such as security conditions, warnings, guidance and the like. If the lighting apparatus 2 is installed in a house, it can give information shared by the family members, such as important memos, personal data about the family members, security conditions, and the like.

At present, people use lighting apparatuses day and night as means for providing "light." The lighting apparatus gives light, thus giving us "information from a view field." The optical-information transmitting, lighting apparatus 2 according to this invention emits illumination lights, transmitting information that solves and meets the psychological questions and demands of a person who is going to do something in the place where the light is available. That is, the illumination light is efficiently utilized, not only illuminating things but also helping people achieve their desires.

The information that the optical-information transmitting, lighting apparatus 2 transmits makes the people staying near the apparatus 2 feel safe and satisfied. The lighting communications system 1 can be used in the advertising business by selling the optical-information transmitting, lighting apparatus 2 or by offering places for installation of the lighting apparatus 2. Even an individual can use the lighting communications system 1 to transmit information, merely by replacing the existing lighting apparatus with the optical-information transmitting, lighting apparatus 2.

A source of coherent light, such as a semiconductor laser, is indispensable to the lighting communications system 1 in order to accomplish spatial transmission of information. The spatial transmission is attained by the use of a source that emits long-wave light. Hence, a source of long-wave light source is indispensable to optical communication. This is why the technology pertaining to a two-wavelength laser or a multi-beam laser is applied in the present invention, to realize high-speed wireless communication.

The source of coherent light may be improved to emit light of longer wavelengths. The intermediate far-infrared band (particularly, a region of 3 to 5 lam or a region of 8 to 13 $_1$.tm), for example, has a part in which light is scarcely absorbed by water vapor in the atmosphere. This part of the intermediate far-infrared band is known as a "window in the atmosphere." The use of the window in the atmosphere accomplishes long-distance optical communication.

The intermediate far-infrared band includes an absorption region at which light is absorbed due to vibration or rotation of various gases. Light having a wavelength within this absorption region can therefore be used to detect gas absorption in the order of ppm (Parts Per Million). Thus, the concentration of gas in a house or a factory can be determined by measuring the amount of the light coming from the information-transmitting unit 5. This can provide information that is important to people in terms of safety and health.

What is claimed is:

1. A lighting apparatus comprising:
   a laser configured to emit optical information, intermittent emission of a laser beam being said optical information;
   a light source configured to emit an illumination light, said laser and a different laser being mounted on said light source;
   wherein a wavelength of different optical information is emissible from said different laser,
   wherein said illumination light is perceptible by a human eye, said optical information and said different optical information being invisible to said human eye.

2. A lighting apparatus according to claim 1, wherein said laser has an emission band in a near-infrared band, an intermediate far-infrared band or a longer wavelength band.

3. A lighting apparatus according to claim 1, wherein said laser is a vertical-plane emission semiconductor laser.

4. A lighting apparatus according to claim 1, further comprising:
   an eye-safe light configured to emit a light beam, said light beam being perceptible by said human eye.

5. A lighting apparatus according to claim 1, wherein said laser is a quantum-cascade semiconductor laser.

6. A lighting apparatus according to claim 1, wherein said laser is a combination of an end-plane emission semiconductor laser, a vertical-plane emission semiconductor laser, and a quantum-cascade semiconductor layer.

7. A lighting apparatus according to claim 1, wherein an emission band of the illumination light is other than a near-infrared band or longer wavelength band.

8. A lighting apparatus according to claim 1, wherein said light source is configured to output an optical signal, intermittent emission of said illumination light being said optical signal.

9. A lighting apparatus according to claim 1, wherein said illumination light is coherent light.

10. A lighting apparatus according to claim 1, wherein said laser is an end-plane emission semiconductor laser.

11. A lighting apparatus according to claim 1, wherein said laser intermittently emits said optical information in a predetermined pattern.

12. A lighting apparatus according to claim 11, comprising:
    a recording medium configured to store data, said data becoming said predetermined pattern.

13. A lighting apparatus according to claim 12, wherein recording medium is removable from the lighting apparatus.

14. A lighting apparatus according to claim 12, further comprising:
    an interface configured to receive external information from an external device, said external information becoming said predetermined pattern.

15. A communications system comprising:
    the lighting apparatus according to claim 1;
    a mobile terminal device configured to receive the optical information.

16. A communications system according to claim 15, wherein said mobile terminal device includes a display unit, said optical information being displayable on said display unit.

17. A lighting apparatus according to claim 1, wherein an emission band of the different optical information is the same as an emission band of the optical information.

18. A lighting apparatus according to claim 1, wherein intermittent emission of a different laser beam is said different optical information.

19. A lighting apparatus according to claim 1, wherein an emission band of the different optical information is other than an emission band of the optical information.

20. A lighting apparatus according to claim 1, wherein said different laser has an emission band in a near-infrared band, an intermediate far-infrared band or a longer wavelength band.

* * * * *